United States Patent [19]

Gross et al.

[11] 4,026,932

[45] May 31, 1977

[54] METHOD FOR CONVERTING ALKENOIC ACID COPOLYMER LATEXES INTO WATER SOLUTIONS

[75] Inventors: James Richard Gross; James Larry Potter; Frederick Bernhard Kassell, all of Lake Jackson, Tex.

[73] Assignee: The Dow Chemical Company, Midland, Mich.

[22] Filed: Dec. 11, 1975

[21] Appl. No.: 640,599

[52] U.S. Cl. .................. 260/29.6 H; 260/29.6 E; 260/29.6 M

[51] Int. Cl.² ........................................ C08L 33/02

[58] Field of Search ............ 260/29.6 H, 29.6 AT, 260/29.6 PM, 29.6 E, 29.6 M; 528/489

[56] References Cited

UNITED STATES PATENTS

| | | | |
|---|---|---|---|
| 2,244,703 | 6/1941 | Hubbuch | 260/29.6 H |
| 3,677,991 | 7/1972 | Moore | 528/489 |
| 3,798,194 | 3/1974 | McCann et al. | 260/29.6 E |
| 3,799,901 | 3/1974 | McCann et al. | 260/29.6 PM |
| 3,926,891 | 12/1975 | Gross et al. | 260/29.6 E |

FOREIGN PATENTS OR APPLICATIONS

| | | | |
|---|---|---|---|
| 595,820 | 4/1960 | Canada | 260/29.6 H |

*Primary Examiner*—M. J. Welsh
*Attorney, Agent, or Firm*—Benjamin G. Colley

[57] ABSTRACT

A method for the preparation of aqueous solutions of anionic polyelectrolytes by combining a stream of a high solid content alkenoic acid-alkyl acrylate latex with a stream of aqueous alkali metal hydroxide, mixing the combined streams under low shear conditions and heating the mixture to produce a polyelectrolyte solution.

The use of these steps avoids the formation of high viscosity mixtures or rubber masses which are difficult, if not impossible, to further process into the desired polyelectrolyte solution.

10 Claims, No Drawings

METHOD FOR CONVERTING ALKENOIC ACID COPOLYMER LATEXES INTO WATER SOLUTIONS

BACKGROUND OF THE INVENTION

The present invention is a method of easily preparing aqueous solutions of anionic polyelectrolytes by dissolving alkali-soluble alkenoic acid-alkyl acrylate latexes in alkali metal hydroxide solutions.

These latexes are known from Fordyce et al. Official Digest 31:284-302 (1959), and Ser. No. 450,650 filed Mar. 13, 1974 now U.S. Pat. No. 3,926,891, dated Dec. 16, 1975. It is extremely difficult to prepare solutions from these latexes having a solids content higher than about 5% due to the extremely high viscosity obtained when alkali metal hydroxide is mixed into an alkali-soluble acrylic latex. In actual practice, the alkali-metal hydroxide coagulates the latex into a rubbery mass which then proceeds to slowly dissolve. Extremely powerful mixers are required to knead the rubbery polymer mass until it dissolves and the viscosity drops to a more manageable level.

The present invention restricts this temporary rubbery phase to only a fraction of the material being dissolved at any given instant. This is accomplished by mixing small increments of the two components (latex and alkali metal hydroxide) on a continuous basis thereby avoiding the need for expensive and large equipment. Production rates in excess of 100 gallons per hour can readily be achieved in equipment using only small diameter piping.

In view of the usual higher raw materials cost for alkenoic acids compared to alkyl acrylates, it is advantageous to use less alkenoic acid in the latex preparation than is desired in the final polyelectrolyte solution. The process of the present invention readily accomodates this change by allowing for the heating of the newly formed polyelectrolyte solution until the pH stabilizes. During this digestion stage the alkali-metal hydroxide, present in excess of the alkenoic acid, reacts with the alkyl acrylate in a saponification reaction thereby producing more alkenoic acid salt in the copolymer.

SUMMARY OF THE INVENTION

It has now been discovered that a high solids alkali soluble alkyl acrylate-alkenoic acid copolymer latexes can be readily converted into a water solution of the alkali metal salts of the copolymer by a process which comprises A. combining a stream of the latex containing 10-50 percent by weight of the copolymer with an aqueous stream containing an alkali metal hydroxide in an amount in molar excess of that required for neutralization of the alkenoic acid functionalty, B. mixing said combined streams under low shear conditions and a temperature range from 40°-90° C to achieve a substantially homogeneous mixture wherein the shearing of the copolymer and the viscosity of the mixture are minimized, and C. heating the mixture to a temperature range from about 40°-90° C for a time sufficient to allow the excess alkali metal hydroxide to saponify the alkyl acrylates moieties in the copolymer equivalent to said excess alkali metal hydroxide.

This process is especially useful when polyelectrolyte solutions of high solids content are desired to decrease shipping costs. One such use for anionic polyelectrolytes is for the preparation of moisture absorbent polymers as set forth in the above mentioned Ser. No. 450,650 filed Mar. 13, 1974. In this instance, it is highly desirable to have a high solids solution which will dry quickly when the moisture absorbent polymer is prepared.

A further advantage of this invention are the energy savings by the use of smaller equipment in processing the alkali-solution latex, in shipping higher solids solution of polyelectrolytes and in decreasing the drying time when a moisture absorbent polymer is prepared.

DETAILED DESCRIPTION OF THE INVENTION

The process of this invention is applicable to high solids content alkenoic acid-alkyl acrylate latexes. The term high solids content means that the amount of the copolymer remaining in the latex after removal of the water is in the range from 10–55% by weight based on the original latex. Preferably, this range is from 35–45 weight percent.

The invention is broadly applicable to alkenoic acid-alkyl acrylate copolymer latexes having about 8 to about 50% and preferably about 15 to about 30% by weight of alkenoic acid. Preferably, the alkenoic acid is methacrylic acid. However, the alkenoic acid used can be a mixture of acrylic and methacrylic acid if desired. The preferred copolymer latex is an ethyl acrylate-methacrylic acid latex containing about 15 to about 30% by weight of methacrylic acid.

The alkyl acrylate used to make the copolymers can have 1–18 carbon atoms in the alkyl moiety. Examples of these are the lower alkyl groups such as methyl, ethyl, propyl, butyl, groups as well as the higher alkyl groups such as the octadecyl, heptadecyl, and hexadecyl groups if desired. Preferably, the alkyl groups can have 1–6 carbon atoms.

The copolymer latex is combined with the aqueous alkali metal hydroxide by continuously flowing metered streams of these materials together at the inlet of a low shear positive displacement zone. Examples of the apparatus which provides the low shear displacement zone that can be used herein are low shear positive displacement pumps such as a Tuthill twin impeller pump or if desired one can impinge the two streams together under high pressure in a suitable chamber.

The combined streams are then mixed under low shear conditions to minimize polymer degradation. This is accomplished in a static mixer zone having at least 5 fixed elements and preferably 7–25 fixed elements.

The temperature during the mixing step is maintained in the range from about 40° to about 90° C and preferably from about 70° to about 80° C to reduce the viscosity of the mixture.

The mixture is then heated or maintained at a temperature in the range from about 40° to about 90° C and preferably from about 70° to about 80° C for a period of time sufficient to allow any residual alkali metal hydroxide to saponify a like amount of alkyl acrylate moieties. This step is generally carried out in a stirred reactor having appropriate heating mechanism. However, a coiled tube reactor may be used if desired provided that it is long enough and heated high enough to give the desired residence time in the reactor to complete the saponification.

The invention is illustrated by, but not limited to, the following preparation and examples.

PREPARATION 1

The acrylic latex used in the following examples was prepared as described below:

| | Part A |
|---|---|
| 2120.0 g | water |
| 6.0 g | sodium bisulfite |
| 1.3 g | sodium persulfate |
| 15.4 g | surfactant (Dowfax 2A1) |
| | Part B |
| 1158.0 g | ethyl acrylate |
| 386.0 g | methacrylic acid |
| | Part C |
| 175.0 g | water |
| 3.9 g | sodium persulfate |

Part A was charged to a 5000 ml round bottom flask equipped with stirrer, heating mantle, cooling fan, and inlets for feed streams. The stirrer was turned on and dry nitrogen bubbled through the solution for 30 minutes to purge the system of air. Part A was then brought to 60° C and 10% of Part B added. When the exotherm subsided, Part B was fed in over the next 5 hours and Part C for 30 minutes longer. The latex was then digested at 60° C for 60 minutes, cooled to 40° C, filtered through a 100 mesh filter, and bottled. It assayed 39.5% non-volatiles. The copolymer was calculated to be about 75 weight percent ethyl acrylate and 25 weight percent methacrylic acid.

EXAMPLES 1–3

A blend of five copolymer latexes prepared as in Preparation 1 (except that one run contained 85% ethyl acrylate) was fed to a Tuthill positive displacement pump at a rate of about 20 cc per minute where it contacted a feed of about 40 cc per minute of sodium hydroxide solutions of various concentrations. The combined streams were then mixed in a static mixer having 10 elements which was heated to various temperatures. The pressure required to push the mixture through the mixer was recorded.

Following this, the mixture was heated at 50°–80° C in a stirred reactor for 6 hours or until the pH stabilized at 7 to 8 to convert the latexes into a water solution of the sodium salts of the copolymer.

In the experiments of Table I, the sodium hydroxide is equivalent to 48 mole percent of the polymer repeating units as shown in the following calculation for the latex blend containing 39.55 percent solids (calculated to be 76.8 mole percent ethyl acrylate and 23.2 mole percent methacrylic acid).

One hundred grams of latex contains 39.55 g polymer consisting of:

| | | | |
|---|---|---|---|
| 30.37 g | ethyl acrylate | = | 0.3037 moles |
| 9.17 g | methacrylic acid | = | 0.1067 moles |
| 39.55 g | total | | 0.4104 moles × 0.48 = 0.1970 moles NaOH |
| | | | = 15.76 g 50% NaOH |

Assuming complete reaction the polymer composition for 100 g latex is:

| Moles | Compound | M.W. | grams |
|---|---|---|---|
| 0.1067 | sodium methacrylate | 108 | 11.52 |
| 0.0903 | sodium acrylate | 94 | 8.49 |
| 0.2134 | ethyl acrylate (unconverted) | 100 | 21.34 |
| 0.4104 | total | | 41.35 g/100 g latex |

Volatile components are:

| | |
|---|---|
| Ethanol (from saponification of ethyl acrylate) | 4.15 g |
| Water (in 50% sodium hydroxide) | 7.88 g |
| Water (in latex) | 60.45 g |
| Water (from neutralization of methacrylic acid) | 1.92 g |
| Total | 74.40 g/100 g latex |

Therefore without additional dilution, solids content of the blend is:

$$\frac{41.35 \text{ g solids}}{41.35 + 74.40} = 35.72\% \text{ solids}$$

The usual reactant charge was 300 g of latex, and 47.3 g 50 percent sodium hydroxide solution, diluted to the concentrations listed in Table I.

The results of these experiments and two controls are shown in Table I.

TABLE I

| Runs | Aqueous NaOH Conc. (% by wt.%) | Static Mixer Temp. (° C) | INlet Pressure (Static Mixer) | Prod. Conc. (wt. % Solids) |
|---|---|---|---|---|
| Control 1 | 7.8 | 25 | 180 psi | 20 |
| Example 1 | 7.8 | 50 | 50 psi | 20 |
| Example 2 | 13.4 | 60 | 80 psi | 25 |
| Example 3 | 13.4 | 73 | 50 psi | 25 |
| Control 2 | 15.8 | 80 | 170 psi | 27 |

From the above table it can be seen that it is important to control temperature and concentration in order to minimize the viscosity of the streams in the static mixer. The pressure at the inlet to the static mixer is directly dependent on the viscosity of the material passing through the mixer.

We claim:
1. A method for converting an alkyl acrylate-alkenoic acid copolymer latex into a water soluble solution of the alkali metal salts of said copolymer which comprises the steps of
   A. combining a stream of said latex containing 10 to 55% by weight of said copolymer with an aqueous stream containing an alkali metal hydroxide in an amount in molar excess of that required for neutralization of the alkenoic acid functionality;
   B. mixing said combined streams under low shear conditions and a temperature range from 40°–90° C to achieve a substantially homogeneous mixture wherein the shearing of the copolymer and the viscosity of the mixture are minimized; and
   C. heating said mixture to a temperature range from about 40° to about 90° C for a time sufficient to allow the excess alkali metal hydroxide to saponify the alkyl acrylate moieties in the copolymer equivalent to said excess alkali metal hydroxide.

2. The process as set forth in claim 1 wherein the alkyl acrylate-alkenoic acid copolymer is an alkyl acrylate-methacrylic acid copolymer.

3. The process as set forth in claim 2 wherein the alkyl acrylate-methacrylic acid copolymer contains about 8 to about 50% by weight of methacrylic acid.

4. A method for converting an alkyl acrylate-alkenoic acid copolymer latex into a water soluble solution of the alkali metal salts of said copolymer which comprises the steps of
   A. combining a stream of said latex containing 10 to 55% by weight of said copolymer with an aqueous stream containing an alkali metal hydroxide in an amount in molar excess of that required for neutralization of the alkenoic acid functionality in a low shear positive displacement pump zone;
   B. mixing said combined streams under low shear conditions and a temperature range from 40°–90° C to achieve a substantially homogeneous mixture wherein the shearing of the copolymer and the viscosity of the mixture are minimized; and
   C. heating said mixture to a temperature range from about 40° to about 90° C for a time sufficient to allow the excess alkali metal hydroxide to saponify the alkyl acrylate moieties in the copolymer equivalent to said excess alkali metal hydroxide.

5. A method for converting an alkyl acrylate-alkenoic acid copolymer latex into a water soluble solution of the alkali metal salts of said copolymer which comprises the steps of
   A. combining a stream of said latex containing 10 to 55% by weight of said copolymer with an aqueous stream containing an alkali metal hydroxide in an amount in molar excess of that required for neutralization of the alkenoic acid functionality;
   B. mixing said combined streams in a static mixer zone under low shear conditions and a temperature range from 40°–90° C to achieve a substantially homogeneous mixture wherein the shearing of the copolymer and the viscosity of the mixture are minimized; and
   C. heating said mixture to a temperature range from about 40° to about 90° C for a time sufficient to allow the excess alkali metal hydroxide to saponify the alkyl acrylate moieties in the copolymer equivalent to said excess alkali metal hydroxide.

6. The process as set forth in claim 4 wherein the alkyl acrylate-alkenoic acid copolymer is an alkyl acrylate-methacrylic acid copolymer.

7. The process as set forth in claim 6 wherein the alkyl acrylate-methacrylic acid copolymer contains about 8 to about 50% by weight of methacrylic acid.

8. The process as set forth in claim 5 wherein the alkyl acrylate-alkenoic acid copolymer is an alkyl acrylate-methacrylic acid copolymer.

9. The process as set forth in claim 8 wherein the alkyl acrylate-methacrylic acid copolymer contains about 8 to about 50% by weight of methacrylic acid.

10. In a method for converting an alkyl acrylate-alkenoic acid copolymer latex into a water soluble solution of the alkali metal salts of said copolymer which comprises the steps of combining said latex containing 10 to 55% by weight of said copolymer with an aqueous solution containing an alkali metal hydroxide in an amount in molar excess of that required for neutralization of the alkenoic acid functionality; mixing said combined streams under low shear conditions and a temperature range from 40°–90° C to achieve a substantially homogeneous mixture wherein the shearing of the copolymer and the viscosity of the mixture are minimized; and heating said mixture to a temperature range from about 40° to about 90° C for a time sufficient to allow the excess alkali metal hydroxide to saponify the alkyl acrylate moieties in the copolymer equivalent to said excess alkali metal hydroxide, the improvement which comprises combining a stream of said latex with a stream of said solution in a low shear positive displacement pump zone and mixing said streams in a static mixer zone.

* * * * *